United States Patent Office 3,524,857
Patented Aug. 18, 1970

3,524,857
3 - INDOLYLMETHYL - 3,4 - DIHYDROISOQUINO-
LINE DERIVATIVES AND PROCESS FOR THEIR
PRODUCTION
John Shavel, Jr., Mendham, and Harold Zinnes, Rock-
away, N.J., assignors to Warner-Lambert Pharma-
ceutical Company, Morris Plains, N.J., a corporation
of Delaware
No drawing. Filed Apr. 27, 1967, Ser. No. 634,133
Int. Cl. C07d 35/34
U.S. Cl. 260—286    5 Claims

ABSTRACT OF THE DISCLOSURE

Compounds of structure I:

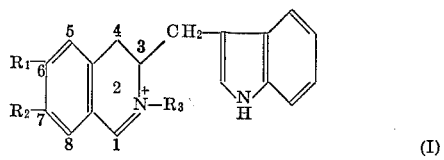

are disclosed wherein $R_1$ and $R_2$ are hydrogen or lower alkoxy and $R_3$ is lower alkyl or aralkyl. They are prepared by rearrangement of compounds of structure V:

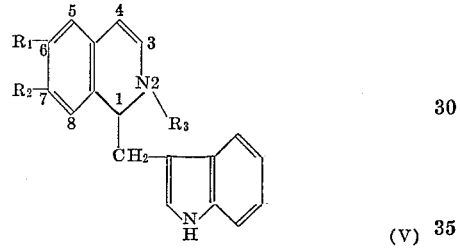

with treatment of one equivalent of acid. These compounds are useful as intermediates in the preparation of analgesic agents of structure Ib:

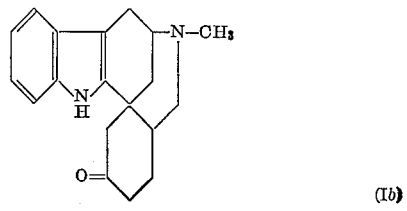

---

This invention relates to certain 3-indolylmethyl-3-4-dihydroisoquinoline derivatives and also relates to a novel method for the production of these isoquinoline derivatives.

The novel 3-indolylmethyl-3-4-dihydroisoquinoline derivatives of this invention may be represented by the following structural formula:

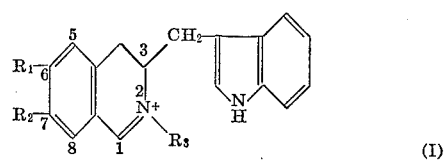

wherein $R_1$ and $R_2$ each represents hydrogen or lower alkoxy and $R_3$ represents lower alkyl or aralkyl.

In the above definition for $R_1$ and $R_2$ lower alkoxy contains from 1 to 6 carbon atoms such as methoxy, ethoxy, propoxy, isopropoxy and the like. The aryl portion of "aralkyl" includes both monohomocyclic ring systems such as phenyl as well as monoheterocyclic ring systems such as furyl, pyridyl and the like. The alkyl portion of "aralkyl" contains from 1 to 6 carbon atoms such as methyl, propyl, isopropyl, ethyl and the like.

The compounds of this invention are useful in the production of certain indolobenzazocines such as those of the formula:

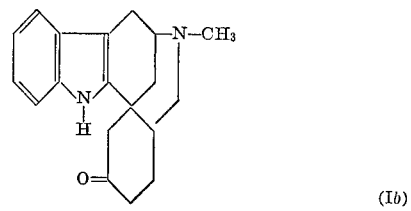

which may be obtained by treating the compounds of this invention with sodium and tertiary butyl alcohol in liquid ammonia followed by treatment of the resulting product with an acid such as hydrochloric acid.

The compounds of structure Ib above exhibit analgesic activities in mammals such as mice and rats and are, accordingly, useful as analgesics. In order to use these benzazocines as analgesics, they are combined with an inert pharmaceutical carrier to form dosage forms such as tablets, capsules or solutions for injection with the active ingredient being present from about 0.1 to about 1.0% by weight. These compounds are administered orally or parenterally at a dose of 1 to 100 mg. several times daily to produce the desired analgesic effect.

The compounds of this invention are produced by treating 1-indolylmethyl-1,2,3,4-tetrahydroisoquinoline of the formula:

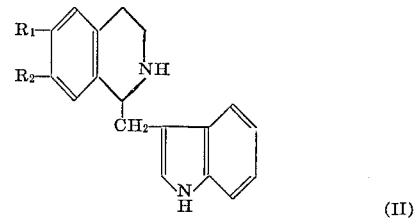

with palladium black in an inert solvent such as p-cymene to give a 1-indolylmethylisoquinoline of the formula:

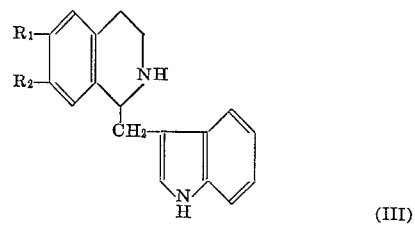

The starting compound II above is prepared in accordance with the procedure described in patent application Ser. No. 396,363, filed Sept. 14, 1964 now U.S. 3,326,923, granted June 20, 1967.

The next step in our novel process involves the quaternization of compound III with a suitable alkyl or aralkyl hailde such as methyl iodide, benzylbromide and the like in an inert solvent such as acetone. The resulting quaternary compound may be represented by the formula:

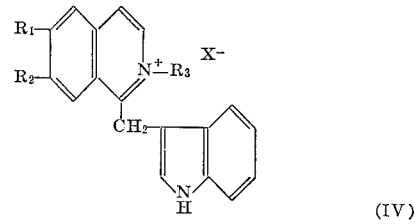

wherein X is a halide ion.

The quaternary compound IV is then reduced to a 1-indolylmethyl-1,2-dihydroisoquinoline of the formula:

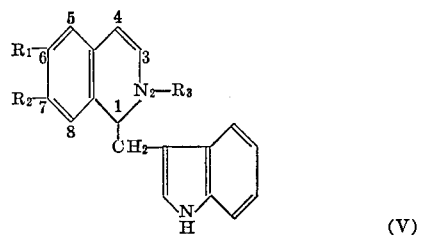

with a suitable reducing agent such as lithium aluminum hydride in an inert solvent such as tetrahydrofuran.

and then rearranged by dissolving in water and heating on a steam bath.

We have found that if more than one equivalent of acid is employed to treat compound V, a completely different type of product, having the structure VII, is obtained.

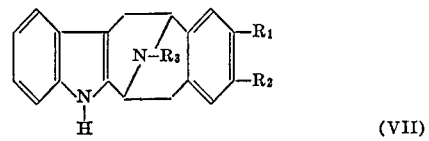

The foregoing reactions may be represented by the following diagram:

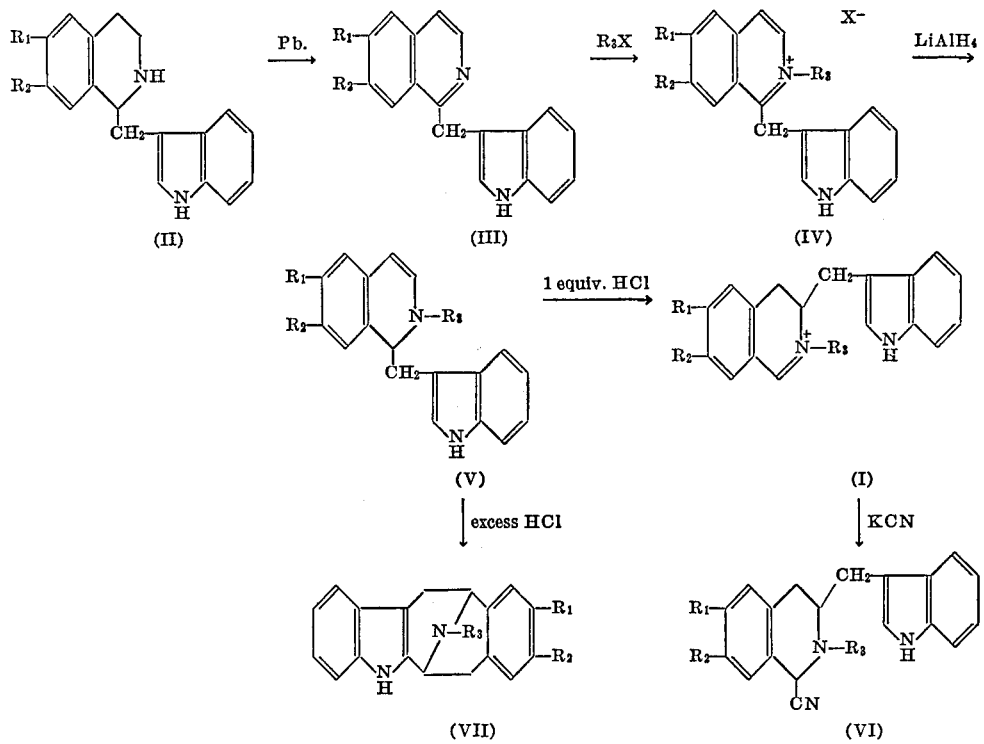

The compound corresponding to structure V is treated with an equivalent of a dilute aqueous acid such as hydrochloric acid and heated to a temperature of about 90 to 95° C. such as on a steam bath to effect rearrangement of the indolylmethyl group from the 1-position to the 3-position of the isoquinoline nucleus to obtain compounds of this invention corresponding to structure I above.

The resulting compound may be isolated in the form of an acid salt such as in the form of its perchlorate. A preferred method comprises treating compound I with an alkali metal cyanide such as sodium potassium cyanide to give a crystalline cyano derivative corresponding to structure VI below:

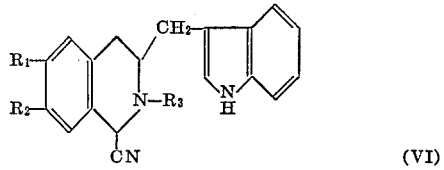

It is an essential feature of this invention that *no more than one equivalent* of acid be used in the rearrangement of compound V to compound I. This is achieved by titrating the tetrahydrofuran solution of V to determine its total alkali content and adding slightly less than one equivalent of dilute hydrochloric acid. Alternatively, the tetrahydrofuran solution is diluted with ether and excess dry ethereal hydrogen chloride is added to cause precipitation of the hydrochloride salt of V. This is washed well with ether to remove excess adsorbed hydrogen chloride The following examples are included in order further to illustrate the invention. All temperatures are given in degrees centigrade, and room temperature is from about 20 to 30° C.

EXAMPLE 1

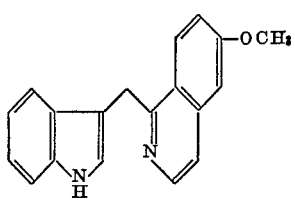

1-(indol-3-ylmethyl)-6-methoxyisoquinoline

A mixture of 125 g. (0.43 mole) of 1,2,3,4-tetrahydro-1-(indol-3-ylmethyl)-6-methoxyisoquinoline, 7.2 g. of palladium black, and 2500 ml. of p-cymene is refluxed under nitrogen with vigorous stirring for 20 hours. The contents are cooled to room temperature, and the mixture of palladium and crystalline product is filtered off. The product is dissolved away from the palladium with dichloromethane and the filtered solution is distilled in vacuo to dryness, the last traces of dichloromethane being removed by distilling from some added Skellysolve C which is essentially n-heptane. The residue is triturated with petroleum ether (30–60°) to give 100.8 g. of 1-(indol-3-ylmethyl)-6-methoxyisoquinoline, M.P. 159—160°. Recrystallization from isopropyl ether gives an analytical sample, M.P. 163–164°.

*Analysis.*—Calcd. for $C_{19}H_{16}NO$ (percent): C, 79.14; H, 5.59; N, 9.72. Found (percent): C, 79.34; H, 5.52; N, 9.48.

Refluxing an acetone solution of 125 g. of the base with excess methyl iodide for 3 hours results in precipitation of 173 g. of the methiodide, M.P. 247–249° dec.

*Analysis.*—Calcd. for $C_{20}H_{19}IN_2O$ (percent): C, 55.83; H, 4.45; N, 6.51. Found (percent): C, 55.53; H, 4.48; N, 6.62.

Refluxing an acetone solution of 15 g. of the base with excess benzyl bromide for 16 hours gives 19.9 g. of the benzyl bromide salt, M.P. 219–222° dec.

EXAMPLE 2

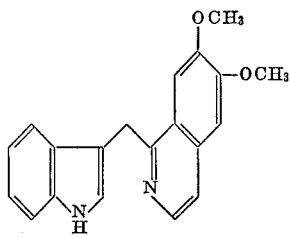

1-(indol-3-ylmethyl)-6,7-dimethoxyisoquinoline

A mixture of 80 g. (0.24 mole) of 1,2,3,4-tetrahydro-1-(indol-3-ylmethyl)-6,7-dimethoxyisoquinoline, 7.6 g. of palladium black, and 520 ml. of p-cymene is refluxed under nitrogen with vigorous stirring for 20 hours. The contents are cooled to room temperature, and the mixture of palladium and crystalline product is filtered off. The product is dissolved away from the palladium by stirring with hot chloroform and the filtered solution is distilled in vacuo to a residue which is recrystallized from methanol-dichloromethane to give 63 g. of 1-(indol-3-ylmethyl)-6,7-dimethoxyisoquinone, M.P. 241–243° dec. Ultraviolet maxima at 216 (E 57,500), 237 (66,000), 268–274 (10,300), 290 sh. (8220), 313 (4100), 326 (4800) mu.

*Analysis.*—Calcd. for $C_{20}H_{18}N_2O_2$ (percent): C, 75.45; H, 5.70; N, 8.80. Found (percent): C, 75.56; H, 5.67; N, 9.02.

Refluxing an acetone (700 ml.) solution of 133 g. of the base with excess methyl iodide for 3 hr. resulted in precipitation of 180 g. of the methiodide, M.P. 245–246° dec.

Refluxing an acetone (700 ml.) solution of 133 g. of the base with excess benzyl bromide for 20 hr. resulted in precipitation of 195 g. of the benzyl bromide quaternary salt, M.P. 217–218.5° dec.

EXAMPLE 3

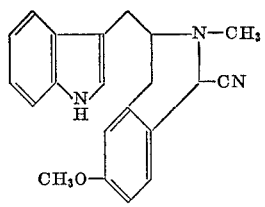

1-cyano-3-(indol-3-ylmethyl)-6-methoxy-2-methyl-1,2,3,4-tetrahydroisoquinoline

A mixture of 87 g. (0.2 mole) of 1-(indol-3-ylmethyl)-6-methoxyisoquinoline methiodide, 15.2 g. (0.4 mole) of lithium aluminum hydride, and 2000 ml. of tetrahydrofuran is stirred 18 to 24 hours overnight at room temperature. The reaction mixture is hydrolyzed in the usual manner and filtered. The filtrate is concentrated on a flash evaporator (maximum temperature is 35°) to a volume of 500 ml. and a 1.0 ml. sample is found by titration to contain 0.391 milliequivalent of base. To 498 ml. (containing 0.1947 equivalent of base) is added 1908 ml. (0.1908 mole) of 0.1 1 N hydrochloric acid followed by 2000 ml. of water. The solution is heated on a steam bath (90°) for 1 hour and allowed to cool to room temperature. The clear yellow solution is decanted from some insoluble gum, made alkaline with sodium bicarbonate, and extracted with dichloromethane. The aqueous layer is treated with excess sodium cyanide and the solid which precipitates on stirring and scratching is collected, washed well with water, and dissolved in dichloromethane. The dried solution is evaporated to a residue which is triturated with benzene to give 31 g. of product, M.P. 152.5–154°. Recrystallization from benzene gives material, M.P. 153–154°.

*Analysis.*—Calcd. for $C_{21}H_{21}N_3O$ (percent): C, 76.10; H, 6.39; N, 12.68. Found (percent): C, 76.21; H, 6.49; N, 12.91.

EXAMPLE 4

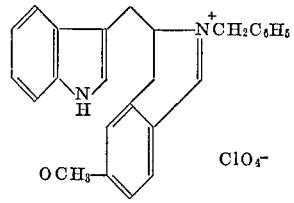

2-benzyl-3-(indol-3-ylmethyl)-6-methoxy-3,4-dihydroisoquinolinium perchlorate

A mixture of 16 g. (0.035 mole) of 2-benzyl-1-indol-3-yl-methyl-6-methoxyisoquinolinium bromide, 4 g. (0.11 mole) of lithium aluminum hydride, and 400 ml. of tetrahydrofuran is stirred overnight at room temperature. The reaction mixture is hydrolyzed and filtered. The filtrate is concentrated on a rotary flash evaporator (maximum temperature is 35°) to a volume of 250 ml. and a 1.0 ml. sample is found to contain 0.12 milliequivalent of base. To 249 ml. (containing 0.0298 equivalent) is added 265.5 ml. of 0.1 N hydrochloric acid followed by 500 ml. of water. The solution is heated on a steam bath (90°) for 1 hr. and allowed to cool to room temperature. The clear yellow solution is decanted from some insoluble gum, made alkaline with sodium bicarbonate, and extracted with dichloromethane. The dichloromethane solution is extracted with several portions of 0.5 N hydrochloric acid. The acidic solution is made basic with dilute sodium hydroxide and extracted with dichloromethane. Evaporation of the dichloromethane gives 6.2 g. of solid residue. This is dissolved in 100 ml. of methanol and a mixture of 4 ml. of 70% aqueous perchloric acid and 36 ml. of methanol is added to cause precipitation of 4.4 g. of crystalline product, M.P. 190–194° dec. Recrystallization from methanol gives an analytical sample, M.P. 192–193° dec.

*Analysis.*—Calcd. for $C_{26}H_{25}ClN_2O_5$ (percent): C, 64.93; H, 5.24; Cl, 7.37; N, 5.82. Found (percent): C, 64.95; H, 5.27; Cl, 7.25; N, 6.07.

EXAMPLE 5

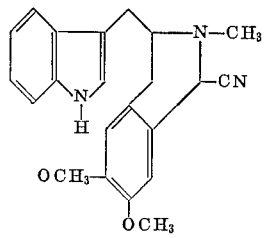

1-cyano-3-(indol-3-ylmethyl)-6,7-dimethoxy-2-methyl-1,2,3,4-tetrahydroisoquinoline A mixture of 10.35 g. (0.0225 mole) of 1-(indol-3-ylmethyl)-6,7-dimethoxyisoquinoline methiodide, 2.6 g. (0.068 mole) of lithium aluminum hydride, and 225 ml. of tetrahydrofuran was stirred overnight at room temperature. The reaction mixture was hydrolyzed and filtered. The filtrate was concentrated on a flash evaporator (maximum temperature was 35°) to a volume of 100 ml. and a 1.0 ml. sample was found by titration to contain 0.223 millequivalent of base. To 97 ml. (containing 0.0212 equivalent of base) was added 212 ml. of 0.1 N hydrochloric acid followed by 238 ml. of water. The solution was heated on a steam bath (90°) for 1 hr. and allowed to cool to room temperature. The clear yellow solution was decanted from some insoluble gum, made alkaline with sodium bicarbonate, and extracted with dichloromethane. The aqueous layer was treated with excess sodium cyanide and the solid which precipitated on stirring and scratching was collected, washed well with water, and dissolved in dichloromethane. The dried solution was evaporated to give 3.5 g. of crystalline product, M.P. 147–149°. Recrystallization from dichloromethane-methanol gave an analytical sample, M.P. 149–150°.

*Analysis.*—Calcd. for $C_{22}H_{23}N_3O_2$ (percent): C, 73.10; H, 6.41; N, 11.63. Found (percent): C, 73.21; H, 6.69; N, 11.73.

We claim:
1. A compound of the formula:

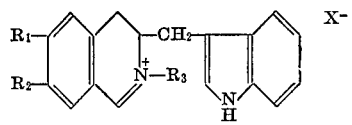

wherein $R_1$ is methoxy, $R_2$ is hydrogen and $R_3$ is lower alkyl or phenyl lower alkyl; and X is hailde or perchlorate.

2. The compound of claim 1 which is 2-benzyl-3-(indol-3 - yl methyl) - 6 - methoxy - 3,4 - dihydroisoquinolinium perchlorate.

3. A compound of the formula:

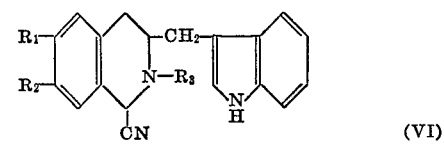 (VI)

wherein $R_1$ is methoxy, $R_2$ is hydrogen and $R_3$ is lower alkyl or phenyl lower alkyl.

4. The compound of claim 3 which is 1-cyano-3-(indol-3 - yl methyl) - 6 - methoxy - 2 - methyl - 1,2,3,4 - tetrahydroisoquinoline.

5. Process for the production of the compound of claim 1 which comprises refluxing together a compound of the formula:

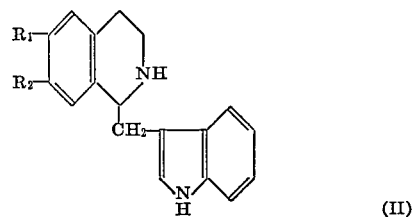 (II)

in an inert solvent in the presence of palladium black to obtain a compound of the formula:

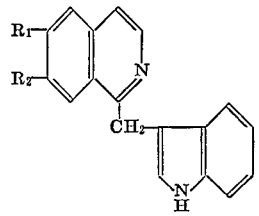 (III)

refluxing said compound with a compound of the formula $R_3X$ to obtain a compound of the formula:

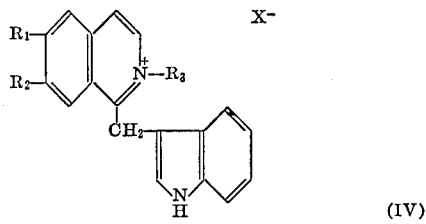 (IV)

contacting said compound IV with lithium aluminum hydride at room temperature to obtain a compound of the formula:

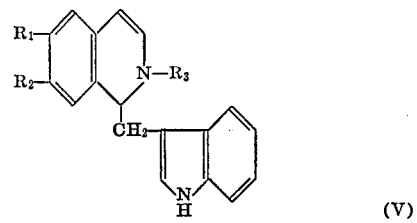 (V)

and followed by contacting said compound V with no more than one equivalent of an acid at a temperature of about 90 to 95° C.

References Cited
UNITED STATES PATENTS

| | | | |
|---|---|---|---|
| 2,814,625 | 11/1967 | Speeter | 260—288 |
| 3,326,923 | 6/1967 | Shavel et al. | 260—288 |
| 3,370,063 | 2/1968 | Suh | 260—287 X |

DONALD G. DAUS, Primary Examiner

U.S. Cl. X.R.

260—288; 424—258